United States Patent
Kim et al.

[11] Patent Number: 6,016,708
[45] Date of Patent: Jan. 25, 2000

[54] EXISTING STRAIN MEASURING APPARATUS FOR ANALYZING STABILITY OF STEEL STRUCTURE AND METHOD THEREOF

[75] Inventors: Woo-Bum Kim; Dong-Su Park; Kyung-Jin Lee; Hwan-Seon Nah, all of Daejeon, Rep. of Korea

[73] Assignee: Korea Electric Power Corporation, Seoul, Rep. of Korea

[21] Appl. No.: 09/090,347

[22] Filed: Jun. 4, 1998

[30]       Foreign Application Priority Data

Jun. 7, 1997  [KR]   Rep. of Korea ...................... 97-23482

[51] Int. Cl.[7] ..................................................... G01M 5/00
[52] U.S. Cl. ................................................. 73/760; 73/804
[58] Field of Search ............................. 73/763, 770, 785, 73/786, 787, 789, 795, 804

[56]                 References Cited

U.S. PATENT DOCUMENTS

| | | |
|---|---|---|
| 4,282,756 | 8/1981 | Molnar et al. ............................. 73/650 |
| 4,480,478 | 11/1984 | Sato et al. ................................. 73/708 |
| 5,668,325 | 9/1997 | Hart et al. ................................. 73/818 |

*Primary Examiner*—Max Noori
*Attorney, Agent, or Firm*—Watson Cole Grindle Watson P.L.L.C.

[57]                   ABSTRACT

An strain measuring apparatus for analyzing the stability of a steel structure and a method thereof employs a controller for receiving a variation difference amount from the strain gauge input unit measured using a strain gauge between a strain degree obtained by applying a weight to a steel structure and a strain degree obtained by applying a weight to a steel structure having a hole formed at a predetermined portion and measuring a strain existing in the steel structure based on the variation amount using particular equations. A control command input unit inputs an initialization command for initialing the existing strain measuring apparatus, a radius of the hole formed in the steel structure, a distance between the center of the hole and the center of the strain gauge attached to the steel structure and an external operating signal including a proceeding command which represents a testing procedure into the controller. A display unit displays the operating procedure of the controller and the existing strain measured, whereby it is possible to measure an existing strain of the steel member at a construction site in which a steel member is provided.

5 Claims, 2 Drawing Sheets

EXISTING STRAIN MEASURING APPARATUS FOR ANALYZING STABILITY OF STEEL STRUCTURE AND METHOD THEREOF

BACKGROUND OF THE INVENTION

1. Field of the Invention

The present invention relates to an strain measuring apparatus for analyzing a stability of a steel structure and a method thereof, and particularly to an improved strain measuring apparatus for analyzing a stability of a steel structure and a method thereof which are capable of converting a value read using a strain gauge at a construction site into an estimation value for thus measuring the current strain of a steel structure.

2. Description of the Conventional Art

Conventionally, a surface corrosion and a defect of a welded portion of a steel structure has been checked by a visual method and non-destructive method. In addition, as other methods, there are known a radiation transmission test, a ultra wave test, a liquid penetration test, etc. for checking a stability of a steel structure at a construction site.

However, the above-described conventional stability checking methods are directed to measuring a deterioration of a steel structure. Therefore, the conventional methods have a disadvantage in that it is impossible to estimate a strains state of a steel structure, so that a static weight test is generally used for estimating a strain state based on a measured data of a weight-variation relationship by loading an actual weight onto a steel structure for thereby checking a stability of a structure.

However, the above-described method is directed to evaluating a strength of a steel structure. Therefore, it takes long time for performing a weight test and the testing method is very complicated. In addition, there are many limitations in manpower and testing site environment.

SUMMARY OF THE INVENTION

Accordingly, it is an object of the present invention to provide an strain measuring apparatus for analyzing a stability of a steel structure and a method thereof which overcome the aforementioned problems encountered in the conventional art.

It is another object of the present invention to provide an strain measuring apparatus for analyzing a stability of a steel structure and a method thereof which are capable of converting a value read using a strain gauge at a construction site into an estimation value for thus measuring the current strain of a steel structure.

To achieve the above objects, there is provided an improved strain measuring apparatus for analyzing a stability of a steel structure according to one embodiment of the present invention which includes a strain gauge input unit for receiving a variation amount of the electric resistance value of a strain gauge attached to a predetermined steel member in a strain direction, a parallel direction, or a vertical direction when applying a predetermined weight is applied to the steel member which is used for analyzing a stability of the same, a signal converting unit (AD part) for converting a variation amount of a strain gauge which is inputted as an analog value from the strain gauge input unit into a digital value, a controller (CPU part) for receiving a variation difference amount from the strain gauge input unit measured using a strain gauge between a strain degree obtained by applying a weight to an initial steel structure and a strain degree obtained by applying a weight to a steel structure having a hole formed at a predetermined portion of the same and measuring a strain existing in the steel structure based on the variation amount using the following Equations 1 and 2, a control command input unit (Keypad part) for inputting an initialization command for initializing the strain measuring apparatus, a radius of the hole formed in the steel structure, a distance between the center of the hole and the center of the stain gauge attached to the steel structure and an external operating signal including a proceeding command which represents a testing procedure into the controller, and a display unit (LCD part) for displaying the operating procedure of the controller and the strain measured, whereby it is possible to measure an strain of the steel member at a construction site in which a steel member is provided, wherein the following equation are satisfied:

$$\delta_x = \frac{\Delta\varepsilon_r}{(A + B\cos2\alpha)} \quad \text{[Equation 1]}$$

$$\delta_x = \frac{\Delta\varepsilon_\theta}{(-A + C\cos2\alpha)} \quad \text{[Equation 2]}$$

where:

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

where $\delta_x$ represents an strain of a steel structure which is to be measured;

$\Delta\varepsilon_r$ represents a varied amount in a radial direction;

$\Delta\varepsilon_\theta$ represents a variation amount in a tangent direction.;

$\nu$ represents a Foason ratio of a material (0.3);

E represents an elastic coefficient of a material ($2.1 \times 10^6$ kg/cm$^2$);

$\nu$ represents $R/R_0$; and $\alpha$ represents an angle in a strain direction (parallel: 0°, and vertical: 90°)

To achieve the above objects, there is provided an improved strain measuring method for analyzing a stability of a steel structure according to another embodiment of the present invention which includes the steps of attaching a strain gauge on a surface of a steel member in a strain direction, a parallel direction or a vertical direction of the steel member, measuring a variation amount of the electric resistance value of the strain gauge in a strain direction, a parallel direction or a vertical direction of the steel member in case that when an original steel member is used and when a predetermined weight is applied to the steel member after forming a predetermined hole at a predetermine portion of the steel member near the portion in which the strain gauge is attached, and measuring an strain of the steel member based on the following Equations 1 and 2 using the thusly obtained strain, wherein the following equations are satisfied:

$$\delta_x = \frac{\Delta\varepsilon_r}{(A + B\cos2\alpha)} \quad \text{[Equation 1]}$$

-continued $$\delta_x = \frac{\Delta\varepsilon_\theta}{(-A + C\cos 2\alpha)} \quad \text{[Equation 2]}$$

where:

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

where $\delta_x$ represents an strain of a steel structure which is to be measured;

$\Delta\varepsilon_r$ represents a varied amount in a radial direction;

$\Delta\varepsilon_\theta$ represents a variation amount in a tangent direction.;

$\nu$ represents a Foason ratio of a material (0.3);

E represents an elastic coefficient of a material ($2.1 \times 10^6$ kg/cm$^2$);

$\nu$ represents $R/R_0$; and $\alpha$ represents an angle in a strain detention (parallel: 0°, and vertical: 90°)

To achieve the above objects, there is provided an improved strain measuring method for analyzing a stability of a steel structure according to still another embodiment of the present invention which includes the steps of a first step for attaching a strain gauge at a predetermined portion of a steel member in a strain direction, a parallel direction or a vertical direction of the steel member and measuring a variation amount of the electric resistance value of the strain gauge when a predetermined weight is applied to the steel member, a second step for forming a circular hole at a predetermined portion of the steel member near the portion to which the strain gauge is attached, a third step for measuring a variation amount of the electric resistance value of the strain gauge when a predetermined weight which is the same as the weight of the first step is applied to the steel member having the hole formed in the second step, and a fourth step for comparing the measured value of the first step and the measured value of the third step and measuring an strain of the steel member based on the following equations 1 and 2 using the thusly obtained variation value, wherein the following equations are satisfied:

$$\delta_x = \frac{\Delta\varepsilon_r}{(A + B\cos 2\alpha)} \quad \text{[Equation 1]}$$

$$\delta_x = \frac{\Delta\varepsilon_\theta}{(-A + C\cos 2\alpha)} \quad \text{[Equation 2]}$$

where:

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

where $\delta_x$ represents an strain of a steel structure which is to be measured;

$\Delta\varepsilon_r$ represents a varied amount in a radial direction;

$\Delta\varepsilon_\theta$ represents a variation amount in a tangent direction.;

$\nu$ represents a Foason ratio of a material (0.3);

E represents an elastic coefficient of a material ($2.1 \times 10^6$ kg/cm$^2$)

$\nu$ represents $R/R_0$; and $\alpha$ represents an angle in a strain direction (parallel: 0°, and vertical: 90°)

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
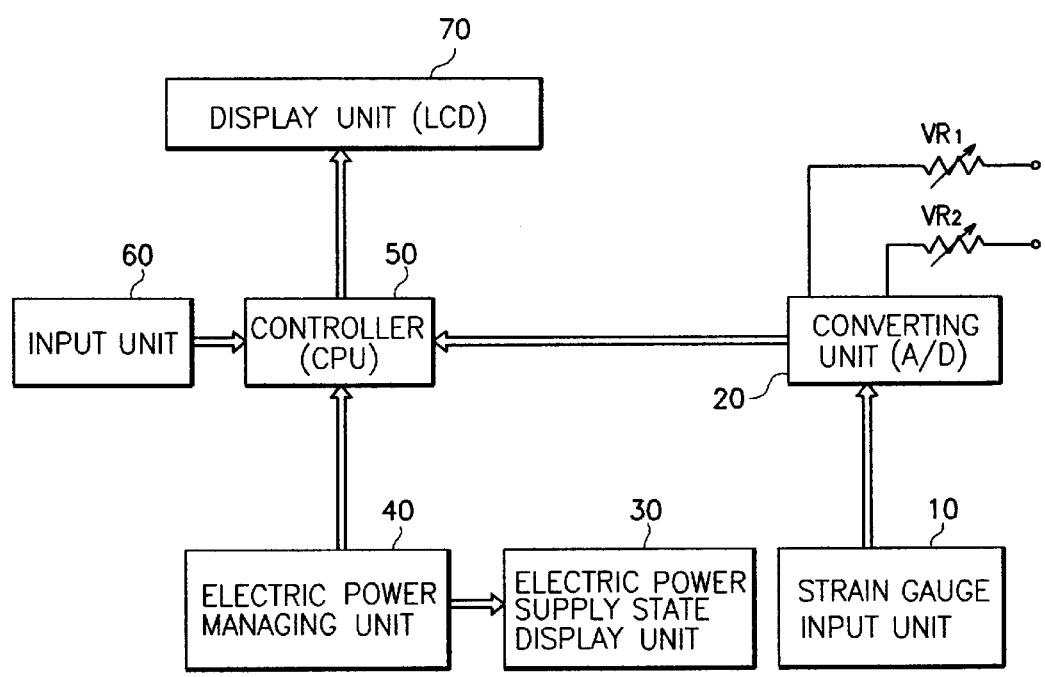
FIG. 1 is a block diagram illustrating an strain measuring apparatus according to the present invention.
Figure 2A:
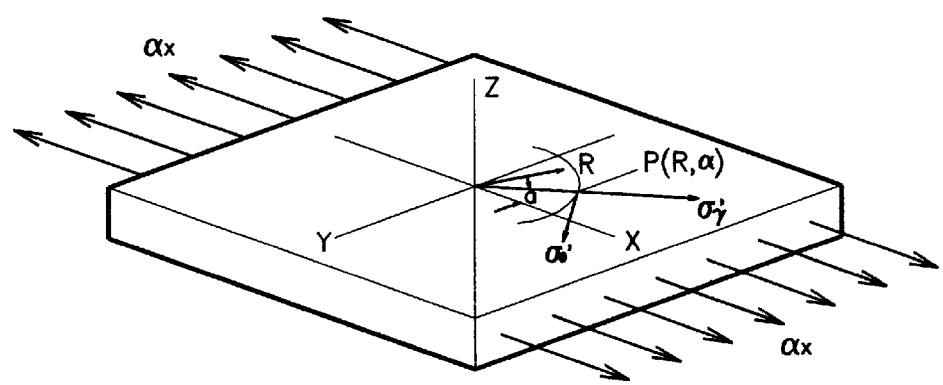
FIGS. 2A and 2B are views illustrating a strain state of a steel structure for explaining a theory of an strain estimation according to the present invention.
Figure 2B:
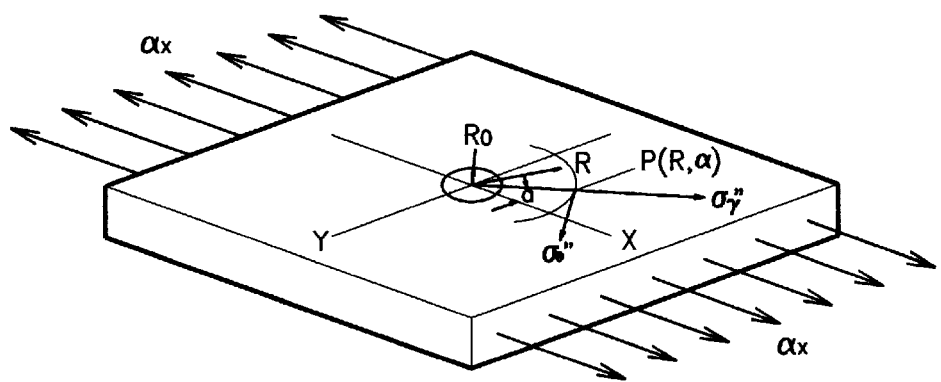

FIG. 1 is a block diagram illustrating an strain measuring apparatus according to the present invention, and FIGS. 2A and 2B are views illustrating a strain state used for explaining a theory with respect to an existing strain estimation according to the present invention.

As shown in FIG. 1, the strain measuring apparatus according to the present invention includes a strain gauge input unit 10 for receiving a variation amount of a strain gauge attached to a steel structure in a strain direction, parallel direction or vertical direction when applying a weight to the steel structure, a signal converting unit 20 (AD part) for converting a strain gauge inputted as an analog value from the strain gauge input unit 10 into a digital value, a controller 50 (CPU part) for receiving a variation difference amount from the strain gauge input unit 10 measured using a strain gauge between a strain degree obtained by applying a weight to an initial steel structure and a strain degree obtained by applying a weight to a steel structure having a hole formed at a predetermined portion of the same and measuring a strain in the steel structure, a control command input unit 60 (Keypad part) for inputting an initialization command for initializing the strain measuring apparatus, a radius of the hole formed in the steel structure, a distance between the center of the hole and the center of the stain gauge attached to the steel structure and an external operating signal including a proceeding command which represents a testing procedure into the controller, a display unit 70 (LCD part) for displaying the operating procedure of the controller 50 and the strain measured, an electric power managing unit 40 (Battery charge part) for charging an electric power, managing the same and supplying an electric power to the controller 50, and an electric power supply state display unit 30 for displaying an electric power supply state of the electric power managing unit 40.

The external signal input unit 60 (Keypad part) includes numeral input buttons (0~9), a backspace button (B: Backspace) which is capable of deleting one character or numeral digit, an initialization button for initializing the measuring apparatus, a proceeding button (E: Enter) for finally selecting an inputted value or function and proceeding a procedure, a digit point button (P: Point) for displaying a digit point when inputting floating point numerals, and a switch for turning on/off the measuring apparatus. R1 and R2 of the converting unit 20 are directed to controlling a zero point and gain, of which, R1 is used for controlling a vertical and horizontal gain, and R2 is used for controlling a vertical and horizontal zero point.

In order to measure a strain at a steel member using an strain measuring apparatus according to the present invention, a strain gauge is attached to a surface of a steel structure like a data logger which uses a stain gauge, and then a predetermined force is applied to the steel member. Thereafter, the length of the strain gauge is varied by the force. The resistance of the stain gauge is varied by the varied length of the strain gauge. The electric resistance value is varied by the variation of the electric field. The strain gauge detects a slight variation of the electric resistance value and the thusly detected value is inputted into the strain measuring apparatus according to the present invention for thereby measuring an strain using the thusly inputted value.

The method for measuring an strain according to the present invention will be explained.

First, for measuring an strain of a steel member, a strain gauge is attached to a predetermined portion of a steel member in a strain direction, parallel direction, or vertical direction of a steel member. In a first step, a variation amount of a stain gauge is measured when a predetermined weight is applied to a steel member. In a second step, a circular hole is formed at a predetermined portion of the steel member to which the strain gauge is attached. In a third step, a variation amount of the strain gauge is measured when a predetermined weight force which is the same as the weight of the first step is applied to the steel member. In addition, in a fourth step, an strain of the steel member is measured based on the thusly varied value. At this time, the length of the strain gauge attached to the steel member is 1 mm in length and 0.5 mm in width. The radius of the circular hole formed in the steel member is 3 mm~6 mm. The distance ratio (r=R/R$_0$) between the distance R from the center of the circular hole and the radius R$_0$ is 2.5~3.5.

The following equation is used for measuring the strain using a variation value of the strain gauge. There are different equations when the strain gauge is attached in the strain direction, the parallel direction, and the vertical direction.

The above-described equations will be explained.

$$\delta_x = \frac{\Delta \varepsilon_r}{(A + B \cos 2\alpha)} \quad \text{[Equation 1]}$$

where $\delta_x$ represents an strain of a steel structure which is to be measured, and $\Delta \epsilon_r$ represents a varied amount in a radius direction.

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

where $\nu$ represents a Foason ratio of a material (0.3), E represents an elastic coefficient of a material (2.1×10$^6$ kg/cm$^2$), and $\nu$ represents R/R$_0$, and $\alpha$ represents an angle in a strain direction (parallel: 0°, and vertical: 90°)

In addition, the equation when the strain gauge is attached in the vertical direction with respect to the strain direction is as follows.

$$\delta_x = \frac{\Delta \varepsilon_\theta}{(-A + C \cos 2\alpha)} \quad \text{[Equation 2]}$$

where $\Delta \epsilon_\theta$ represents a variation amount in a tangent direction.

$$C = -\left(\frac{1+\nu}{2E}\right)\left[-\frac{4}{(1+\nu)}\frac{1}{\gamma^2} + \frac{3}{\gamma^4}\right]$$

The background theory of the present invention will now be explained with reference to the Equations and FIGS. 2A and 2B.

First, as shown in FIG. 2A, it is assumed that an equal axial strain $\delta_x$ is applied to a predetermined area of a thin plate. At this time, the polarity coordinates of the initial strain state is expressed as follows at the points P (R, a) of the plate.

$$\delta'_r = \frac{\delta_x}{2}(1 + \cos 2\alpha)$$

$$\delta'_\theta = \frac{\delta_x}{2}(1 + \cos 2\alpha)$$

$$\gamma'_{r\theta} = -\frac{\delta_x}{2}\sin 2\alpha$$

where $\delta'_r$ represents an initial strain in a radius direction, $\delta'_\theta$ represents an initial strain in a tangent direction, and $\gamma'_{r\theta}$ represents an initial shearing strain.

As shown in FIG. 2B, a circular hole is formed to have a radius R$_0$ from the center of the plate, and then the strain around the hole is released. The next strain state at portions P(R, a) of the plate may be expressed as follows.

$$\delta''_r = \frac{\delta_x}{2}\left(1 - \frac{1}{\gamma^2}\right) + \frac{\delta_x}{2}\left(1 + \frac{3}{\gamma^4} - \frac{4}{\gamma^2}\right)\cos 2\alpha \quad \text{[Equation 3]}$$

$$\delta''_\theta = \frac{\delta_x}{2}\left(1 - \frac{1}{\gamma^2}\right) - \frac{\delta_x}{2}\left(1 + \frac{3}{\gamma^4}\right)\cos 2\alpha \quad \text{[Equation 4]}$$

$$\gamma''_{r\theta} = \frac{-\delta_x}{2}\left(1 - \frac{3}{\gamma^4} + \frac{4}{\gamma^2}\right)\sin 2\alpha \quad \text{[Equation 5]}$$

where r=R/R$_0$

As a result, the released strain value after forming a circular hole is obtained by the following equations.

$$\Delta \delta_r = \delta''_r - \delta'_r \quad \text{[Equation 6]}$$

$$\Delta \delta_\theta = \delta''_\theta - \delta'_\theta \quad \text{[Equation 7]}$$

$$\Delta \gamma_r = \gamma''_r - \gamma'_r \quad \text{[Equation 8]}$$

Based on the above Equations 6, 7 and 8, the following equations are obtained.

$$\Delta\varepsilon_r = \frac{1}{E}(\Delta\delta_r - \nu\Delta\delta_\theta) \qquad \text{[Equation 9]}$$

$$= -\frac{1}{E}\frac{\delta_x(1+\nu)}{2}\left[\frac{1}{\gamma^2} + \frac{3\cos2\alpha}{\gamma^4} - \frac{4\cos2\alpha}{\gamma^2(1+\nu)}\right]$$

$$\Delta\varepsilon_\theta = \frac{1}{E}(\Delta\delta_\theta - \nu\Delta\delta_r) \qquad \text{[Equation 10]}$$

$$= -\frac{1}{E}\frac{\delta_x(1+\nu)}{2}\left[-\frac{1}{\gamma^2} + \frac{3\cos2\alpha}{\gamma^4} - \frac{4\cos2\alpha}{\gamma^2(1+\nu)}\right]$$

Therefore, the strain of the steel structure is obtained based on the following equation.

$$\delta_x = \frac{\Delta\varepsilon_r}{A + B\cos2\alpha} \qquad \text{[Equation 1]}$$

$$\delta_x = \frac{\Delta\varepsilon_\theta}{-A + C\cos2\alpha} \qquad \text{[Equation 2]}$$

Therefore, $$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

Therefore, the strain of the steel member is obtained based on $\Delta\epsilon_r$, $\Delta\epsilon_\theta$, $\nu$, r, a, and E values using the Equations 1 and 2.

When measuring the strain using a strain measuring apparatus which is configured based on the above-described equations, a strain gauge is attached to a steel member in a state that a predetermined weight is applied to a portion of the steel member. Thereafter, the variation amount is measured, and the distance ration $R/R_0$ between the size of the hole and the distance between the hole and the measuring point, and the size of the stain gauge such as a Rosette gauge are determined. In a state that a predetermined weight is applied to a steel member having a hole near the strain gauge, the released variation amount of the strain gauge is measured for thereby measuring an strain.

At this time, if the size of the circular hole, the $r(=R/R_0)$ and the length of the strain gauge are too small, the error of the estimation value is increased. Therefore, the above values are preferably maintained within the following range. In this case, an upper and lower error range is 10%.

The size of the circular hole: 3 mm~6 mm $r(=R/R_0)$: 2.5~3.5

The size of the strain gauge: 1 mm in length, less than 0.5 mm in width

The method for measuring the strain is implemented as follows using a measuring apparatus according to the present invention.

First, a strain gauge is attached on the surface of the steel member and is connected with an strain measuring apparatus. Thereafter, an ON/OFF switch of the external signal input unit 30 (Keypad) is set to ON, and then "I" button is pressed. The value of the stain gauge is displayed on the display unit 20 (LCD). At this time, the upper portion characters H-CH are the values of the stain gauge in the horizontal direction, and the lower portion characters V-CH are the values of the strain gauge in the vertical direction. In this case, the unit is ㎲. The "I" button is pressed three or four times until the identical value is obtained.

| | |
|---|---|
| H-CH: | 0.00 |
| V-CH: | 0.00 |

In this state, when "E" button is twice pressed, the following content is displayed on the display unit 20 (LCD).

| |
|---|
| Continue? |

At this time, when "E" button is pressed twice more, the current strain gauge value is stored, and the following content is displayed on the display unit 20 (LCD).

| |
|---|
| R? |

"R" value ("R" represents a distance between the center of the hole and the center of the strain gauge) is inputted, and "E" button is pressed in order to inform that the input is finished. The following content is displayed on the screen (for example, it is assumed that the "R" value is 3).

| |
|---|
| R?3 |
| R0 |

When the "R" value is inputted, the "$R_0$" value (this value is a radius of the hole) is inputted, and then the "E" button is pressed. While the vale of the strain gauge is read again, the content of the "initialing" is displayed. At this time, the upper portion character H-CH is a variation amount of the strain gauge in the horizontal direction, and the lower portion character V-CH is a variation amount of the strain gauge in the vertical direction. At this time, the unit is $\mu$.

| | |
|---|---|
| dε | H-CH = 12.00u |
| dε | V-CH = 34.00u |

In this state, a hole is formed at a predetermined portion using a drilling machine. When the hole is formed, dε is decreased, and when the "E" button is once pressed, the following is displayed on the screen.

| |
|---|
| Continue? |

In the above state, when the "E" button is pressed twice, an existing strain based on the variation amount of the strain gauge in the radius direction and an strain based on the variation amount of the strain gauge in the tangent direction are displayed as follows. At this time, the unit is Kg/cm².

| |
|---|
| δx = Existing strain based on the radius direction |
| δx = Existing strain based on the tangent direction |

When the above-described operations are performed, it is possible to measure an existing strain based on a strain gauge in a radius direction and a tangent direction. When measuring the existing strain again, the "I" button of the external signal input unit 30 (Keypad) is pressed or the ON/OFF switch is turned off and then on.

As described above, in the present invention, the value read from the strain gauge at a construction site in which a steel member which is to be checked is provided is converted into an existing strain estimation value, so that the current strain of the steel member is obtained, whereby it is possible to simply and quickly analyzes the stability of the steel structure by knowing the current weight value of a predetermined member.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A strain measuring apparatus, comprising:

a strain gauge input unit for receiving a variation amount of the electric resistance value of a strain gauge attached to a predetermined steel member in a strain direction, a parallel direction, or a vertical direction when a predetermined weight is applied to the steel member which is used for analyzing a stability of the strain measuring apparatus;

a signal converting unit (AD part) for converting a variation amount of the electric resistance value of a strain gauge which is inputted as an analog value from the strain gauge input unit into a digital value;

a controller (CPU part) for receiving a variation difference amount between a strain degree obtained by applying a weight to an initial steel structure and a strain degree obtained by applying a weight to a steel structure having a hole formed at a predetermined portion of the steel structure, from the strain gauge input unit, and controlling to measure a strain in the steel structure using the variation difference amount and the following equations 1 and 2;

a control command input unit (Keypad part) for inputting an initialization command for initializing the strain measuring apparatus, a radius of the hole formed in the steel structure, a distance between the center of the hole and the center of the strain gauge attached to the steel structure and an external operating signal including a proceeding command which represents a testing procedure into the controller; and a display unit (LCD part) for displaying the operating procedure of the controller and the strain measured, whereby it is possible to measure a strain of the steel member at a construction site in which a steel member is provided, wherein the following equation are satisfied:

$$\delta_x = \frac{\Delta\varepsilon_r}{(A + B\ \cos 2\alpha)} \quad \text{[Equation 1]}$$

$$\delta_x = \frac{\Delta\varepsilon_\theta}{(-A + C\ \cos 2\alpha)} \quad \text{[Equation 2]}$$

where:

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

where $\delta_x$ represents a strain of a steel structure which is to be measured;

$\Delta\varepsilon_r$ represents a varied amount in a radial direction;

$\Delta\varepsilon_\theta$ represents a variation amount in a tangent direction;

$\nu$ represents a Foason ration of a material (0.3);

E represents an elastic coefficient of a material ($2.1 \times 10^6$ kg/cm$^2$);

$\nu$ represents $R/R_0$; and $\alpha$ represents an angle in a strain direction (parallel: 0°, and vertical: 90°).

2. A strain measuring method of analyzing a stability of a steel structure, comprising the steps of:

attaching a strain gauge on a surface of a steel member in a strain direction, a parallel direction, or a vertical direction of the steel member;

measuring a variation amount of the electric resistance value of the strain gauge between a strain degree obtained by applying a weight to an initial steel structure and a strain degree obtained by applying a weight to a steel structure having a hole formed near the portion in which the strain gauge is attached, in a strain direction, a parallel direction, or a vertical direction of the steel member; and measuring a strain of the steel member using the obtained strain and the following equations 1 and 2, wherein the following equations are satisified:

$$\delta_x = \frac{\Delta\varepsilon_r}{(A + B\ \cos 2\alpha)} \quad \text{[Equation 1]}$$

$$\delta_x = \frac{\Delta\varepsilon_\theta}{(-A + C\ \cos 2\alpha)} \quad \text{[Equation 2]}$$

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

where: $\delta_x$ represents a strain of a steel structure which is to be measured;

$\Delta\varepsilon_r$ represents a varied amount in a radial direction;

$\Delta\varepsilon_\theta$ represents a variation amount in a tangent direction;

$\nu$ represents a Foason ration of a material (0.3);

E represents an elastic coefficient of a material ($2.1 \times 10^6$ kg/cm$^2$);

$\nu$ represents $R/R_0$; and $\alpha$ represents an angle in a strain direction (parallel: 0°, and vertical: 90°).

3. A strain measuring method for analyzing a stability of a steel member, comprising the steps of:

(a) attaching a strain gauge at a predetermined portion of a steel member in a strain direction, a parallel direction, or a vertical direction of the steel member, and measuring a variation amount of the electric resistance value of the strain gauge when a predetermined weight is applied to the steel member;

(b) forming a circular hole near the portion to which the strain gauge is attached;

(c) measuring a variation amount of the electric resistance value of the strain gauge when the weight as same as the weight of the step is applied to the steel member having the hole; and (d) comparing the measured value of the step (a) and the measured value of the (c) and measuring a strain of the steel member using the obtained variation value and the following equations 1 and 2, wherein the following equations are satisifed:

$$\delta_x = \frac{\Delta\varepsilon_r}{(A + B\cos 2\alpha)} \qquad \text{[Equation 1]}$$

$$\delta_x = \frac{\Delta\varepsilon_\theta}{(-A + C\cos 2\alpha)} \qquad \text{[Equation 2]}$$

where:

$$A = -\left(\frac{1+\nu}{2E}\right)\left(\frac{1}{\gamma^2}\right)$$

$$B = -\left(\frac{1+\nu}{2E}\right)\left[\frac{4}{(1+\nu)}\frac{1}{\gamma^2} - \frac{3}{\gamma^4}\right]$$

$$C = -\left(\frac{1+\nu}{2E}\right)\left[-\frac{4}{(1+\nu)}\frac{1}{\gamma^2} + \frac{3}{\gamma^4}\right]$$

where $\delta_x$ represents a strain of a steel structure which is to be measured;

$\Delta\varepsilon_r$ represents a varied amount in a radial direction;

$\Delta\varepsilon_\theta$ represents a variation amount in a tangent direction;

$\nu$ represents a Foason ration of a material (0.3);

E represents an elastic coefficient of a material ($2.1\times10^6$ kg/cm$^2$);

$\nu$ represents $R/R_0$; and $\alpha$ represents an angle in a strain direction (parallel: 0°, and vertical: 90°).

4. The method of claim 3, wherein in said step (a), the size of the strain gauge attached to the steel member is about 0.9 mm to about 1.1 mm in length and less than about 0.5 mm in width.

5. The method of claim 3, wherein in said step (b), the radius of the circular hole is about 3 mm about 6 mm, and the distance ratio r(R/Ro) is set between about 2.5 and about 3.5 where the R is the distance between the center of the circular hole and the strain gauge and the Ro is the radius.

* * * * *